United States Patent
Chang et al.

(10) Patent No.: US 7,702,030 B2
(45) Date of Patent: Apr. 20, 2010

(54) MODULE TO MODULE SIGNALING WITH JITTER MODULATION

(75) Inventors: Charles E. Chang, Coto DeCaza, CA (US); Keith R. Jones, Irvine, CA (US); Maurice M. Reintjes, Beverton, OR (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 1772 days.

(21) Appl. No.: 10/739,908

(22) Filed: Dec. 17, 2003

(65) Prior Publication Data

US 2005/0135501 A1    Jun. 23, 2005

(51) Int. Cl.
*H04L 27/00* (2006.01)
*H03D 3/24* (2006.01)

(52) U.S. Cl. .................. 375/295; 375/376

(58) Field of Classification Search ......... 375/295–296, 375/316, 371, 373, 375–376; 370/516–518; 327/276, 155–156
See application file for complete search history.

(56) References Cited

U.S. PATENT DOCUMENTS

| | | | |
|---|---|---|---|
| 4,534,064 A | 8/1985 | Giacometti et al. | |
| 5,019,769 A | 5/1991 | Levinson | |
| 5,313,173 A * | 5/1994 | Lampe | 332/103 |
| 5,383,046 A | 1/1995 | Tomofuji et al. | |
| 5,383,208 A | 1/1995 | Queniat et al. | |
| 5,394,416 A | 2/1995 | Ries | |
| 5,396,059 A | 3/1995 | Yeates | |
| 5,488,627 A * | 1/1996 | Hardin et al. | 375/139 |
| 5,594,748 A | 1/1997 | Jabr | |
| 5,636,254 A * | 6/1997 | Hase et al. | 375/371 |
| 5,812,572 A | 9/1998 | King et al. | |
| 5,844,928 A | 12/1998 | Shastri et al. | |
| 5,900,959 A | 5/1999 | Noda et al. | |
| 5,956,168 A | 9/1999 | Levinson et al. | |
| 6,108,113 A | 8/2000 | Fee | |
| 6,111,687 A | 8/2000 | Tammela | |
| 6,259,293 B1 * | 7/2001 | Hayase et al. | 327/276 |
| 6,282,017 B1 | 8/2001 | Kinoshita | |
| 6,366,373 B1 | 4/2002 | MacKinnon et al. | |
| 6,452,719 B2 | 9/2002 | Kinoshita | |
| 6,473,418 B1 * | 10/2002 | Laroia et al. | 370/344 |
| 6,494,370 B1 | 12/2002 | Sanchez | |
| 6,556,601 B2 | 4/2003 | Nagata | |
| 6,570,944 B2 * | 5/2003 | Best et al. | 375/355 |
| 6,580,328 B2 * | 6/2003 | Tan et al. | 331/17 |
| 6,661,940 B2 | 12/2003 | Kim | |
| 6,707,600 B1 | 3/2004 | Dijaili et al. | |

(Continued)

*Primary Examiner*—Khanh C Tran
(74) *Attorney, Agent, or Firm*—Weide & Miller, Ltd.

(57) ABSTRACT

A method and apparatus is disclosed for incorporating secondary data for transmission as part of or concurrently with network data. In one embodiment, the secondary data comprises communication system data for use in controlling or monitoring a communication system. In one example embodiment, the secondary data is utilized to control the transmit timing of the network data to thereby jitter modulate the secondary data into the transmission of the network data. By monitoring the timing variation, or jitter, of the received network data signal, the secondary data may be recovered. In one embodiment, the secondary data is encoded to reduce the amount of time variation, i.e., jitter, that occurs when transmitting the network data. Decoding may occur upon reception of the time adjusted network data signal. In one embodiment, the encoding comprises CDMA type encoding utilizing one or more orthogonal codes.

9 Claims, 11 Drawing Sheets

U.S. PATENT DOCUMENTS

| | | |
|---|---|---|
| 6,740,864 B1 | 5/2004 | Dries |
| 6,788,743 B1 * | 9/2004 | Pfeil .......................... 375/271 |
| 6,801,555 B1 | 10/2004 | Dijaili et al. |
| 6,837,625 B2 | 1/2005 | Schott et al. |
| 6,852,966 B1 | 2/2005 | Douma et al. |
| 6,868,104 B2 | 3/2005 | Stewart et al. |
| 6,888,123 B2 | 5/2005 | Douma et al. |
| 6,934,307 B2 * | 8/2005 | DeCusatis et al. ........... 370/518 |
| 6,941,077 B2 | 9/2005 | Aronson et al. |
| 6,952,531 B2 | 10/2005 | Aronson et al. |
| 6,956,643 B2 | 10/2005 | Farr et al. |
| 6,957,021 B2 | 10/2005 | Aronson et al. |
| 6,967,320 B2 | 11/2005 | Chieng et al. |
| 7,031,574 B2 | 4/2006 | Huang et al. |
| 7,039,082 B2 | 5/2006 | Stewart et al. |
| 7,046,721 B2 * | 5/2006 | Grohn ........................ 375/219 |
| 7,050,720 B2 | 5/2006 | Aronson et al. |
| 7,058,310 B2 | 6/2006 | Aronson et al. |
| 7,066,746 B1 | 6/2006 | Togami et al. |
| 7,079,775 B2 | 7/2006 | Aronson et al. |
| 7,123,665 B2 * | 10/2006 | Brown et al. ................. 375/303 |
| 7,227,913 B1 * | 6/2007 | Hein et al. ................... 375/327 |
| 2004/0047635 A1 | 3/2004 | Aronson et al. |
| 2004/0136727 A1 | 7/2004 | Androni et al. |
| 2005/0215090 A1 | 9/2005 | Harwood |

\* cited by examiner

MODULE TO MODULE SIGNALING WITH JITTER MODULATION

FIELD OF THE INVENTION

The invention relates to communication systems and, in particular, to a method and apparatus for inter-module communication.

RELATED ART

Communication systems designed to communicate data between remotely located stations that utilize electrical or optical signals have been widely implemented throughout the world. The stations may comprise communication modules designed to demodulate the data, or repeaters, provided to span long distances between remote locations.

It may be desirable to enable system level communication between remotely located stations to exchange communication system data in addition to the network data, thereby improving the transfer of network data between the stations. For example, it is contemplated that analysis could occur on the network data in an attempt to optimize operation of the communication system and that this optimization may be transmitted to another station in the communication system.

Prior art solutions for exchanging system data between remote stations suffer from numerous problems and drawbacks. One prior art solution comprises forcing the communication system to cease transmission of network data so that system data can be exchanged. This is extremely undesirable because it forces the communication system to stop the transmission of network data. This undesirably interrupts operation of the communication system and reduces the overall transmission rate of the communication system for network data.

As an alternative, it has been proposed to insert the system data into the network data, such as by padding the system data bits onto the network data. This, too, is highly undesirable, as it increases the necessary transmit rate in order to accommodate the additional bit. Moreover, it may require that the network data be demodulated, and then re-modulated with the additional system data. This requires additional hardware in each station. In addition, inclusion of system data into the network data stream may cause operation of the communication system to fall outside of the communication standard under which the communication system is operating. This in turn may require non-standard communication hardware or software to accommodate these changes.

As a result, there exists a need for an efficient, cost-effective, and accurate method and apparatus to achieve communication of system data between stations.

SUMMARY

To address the need in the art for an efficient and low-complexity inter-station signaling system, a system is disclosed herein for jitter modulating secondary data onto the transmission of network data. The term secondary data is used interchangeably with the term system data and as used herein is defined to have the same meaning. In one embodiment, this system comprises a phase lock loop circuit configured to receive a clock signal and a filter configured to filter the output of the phase lock loop circuit to create a filtered signal. A voltage controlled oscillator is provided to generate an output signal based on the voltage of the filtered signal for use in controlling the phase lock loop circuit. Also part of this system is a variable delay that is configured to introduce an amount of delay into the output signal to create a modified output signal and the amount of delay may be controlled by secondary data. A multiplexer is also provided and is configured to receive network data in a parallel format and output the network data from the multiplexer in a serial format such that the timing of the outputting of the network data from the multiplexer is controlled by the modified output signal.

In one embodiment, the modified output signal represents the secondary data. In one embodiment, the system further comprises a frequency control module configured to modify the frequency of the output signal passing from the voltage controlled oscillator to the phase lock loop. In one such embodiment the system data is thus frequency modulated by time-varying the phase modulation. In another embodiment, the system further comprises an encoder configured to encode the secondary data prior to the secondary data being provided to the variable delay. It is contemplated that the encoder may utilize an orthogonal code.

In another embodiment, a system is provided for modulating secondary data onto a network data signal in a communication device. This device comprises an input for receiving a timing control signal and a timing control system configured to receive the timing control signal, re-time the timing control signal based on the secondary data to create a re-timed control signal, and output the re-timed control signal. The system also includes a switching device that is configured to receive the re-timed control signal and network data and selectively output network data at a time determined by the re-timed control signal.

In one variation to this system, the step of selectively outputting network data based on the re-timed control signal jitter modulates the secondary data onto the network data. In one embodiment, the secondary data comprises system data configured to control operation of a communication device. It is contemplated that the timing control system may comprise a variable delay. As disclosed herein, it is contemplated that the system may further comprise an encoder configured to encode the secondary data, which in turn affects the retiming of the timing control signal. This encoder may utilize an orthogonal code to encode the secondary data.

Also disclosed herein is a method for combining secondary data with network data to allow transmission of the system data with the network data over an optic fiber. In one embodiment, this method comprises the steps of receiving network data and secondary data. The system next generates a transmit timing signal configured to control transmit timing of the network data and introduces a delay into the transmit timing signal to create a re-timed transmit timing signal. The amount of delay may be controlled by the secondary data. Also performed as part of this method is the step of providing the re-timed transmit timing signal and the network data to a processing device configured to control, based on the re-timed transmit timing signal, when the network data is output or transmitted. Thus, the method outputs the network data from the processing device at a time controlled by the re-timed transmit timing signal.

In various embodiments, the processing device may comprise a parallel to serial converter and the delay caused by the re-timed transmit timing signal may introduce low frequency jitter into transmission of the network data. It is also contemplated that the system data or secondary data may control at least one aspect of operation of a remote communication device. In at least one embodiment, this method further comprises encoding the secondary data utilizing an orthogonal code to create encoded secondary data such that the delay is controlled by the encoded secondary data. An orthogonal code may be utilized to create the encoded secondary data.

Due to loop bandwidth limitations, in one embodiment the transmission rate of the secondary data may be less than the transmission rate of the network data.

Also disclosed herein is a method for jitter modulating system data with network data to allow transmission of the system data with the network data. In one embodiment, this method comprises receiving network data and receiving system data for transmission with the network data. After reception, the system processes the network data to control the transmit timing of the network data such that the transmit timing is controlled by the system data. In one embodiment, system data provides information to a remote station regarding one or more aspects of operation of a communication system.

After transmission, it is necessary to recover the jitter modulated secondary data. Accordingly, also disclosed herein is a detector for use in a communication system configured to recover secondary data from a received signal. In one embodiment, the detector comprises a network data recovery system configured to recover network data from the received signal, wherein as part of the recovery of network data a loop signal is generated. A voltage detector is included and configured to process the loop signal to determine a change in voltage in the loop signal and is further configured with an output configured to output secondary data from the voltage detector. In one embodiment, the secondary data is related to the change in voltage in the loop signal. Devices other than a voltage detector may be utilized to isolate the secondary data.

It is contemplated that the network data recovery system may comprise a phase detector and a voltage controlled oscillator. In one embodiment, the detector further comprises a decoder configured to perform decoding of the loop signal to thereby recover the secondary data. The decoder may utilize an orthogonal code. It is further contemplated that secondary data may comprise system data configured to provide information regarding one or more aspects of operation of the communication system.

A method for recovering secondary data from network data having secondary data jitter modulated thereon after reception of the network data at a receiving communication device is also disclosed. In one embodiment, this method comprises receiving an input signal comprising network data that has been jitter modulated to contain secondary data. Thereafter, the method processes the input signal with a phase detector to recover the network data and generates a loop signal as part of phase detector operation. This method of operation filters the loop signal to generate a filtered loop signal and processes the filtered loop signal with the voltage detector to recover the secondary data.

In one embodiment, processing the filtered loop signal comprises detecting the changes in voltage in the filtered loop signal to obtain the secondary data. For example, the changes in voltage may correspond to low frequency jitter. It may be necessary, as part of the processing of the filtered loop signal, to decode the filtered loop signal to obtain the secondary data. One form of decoding may comprise multiplying the filtered loop signal with a spreading code.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
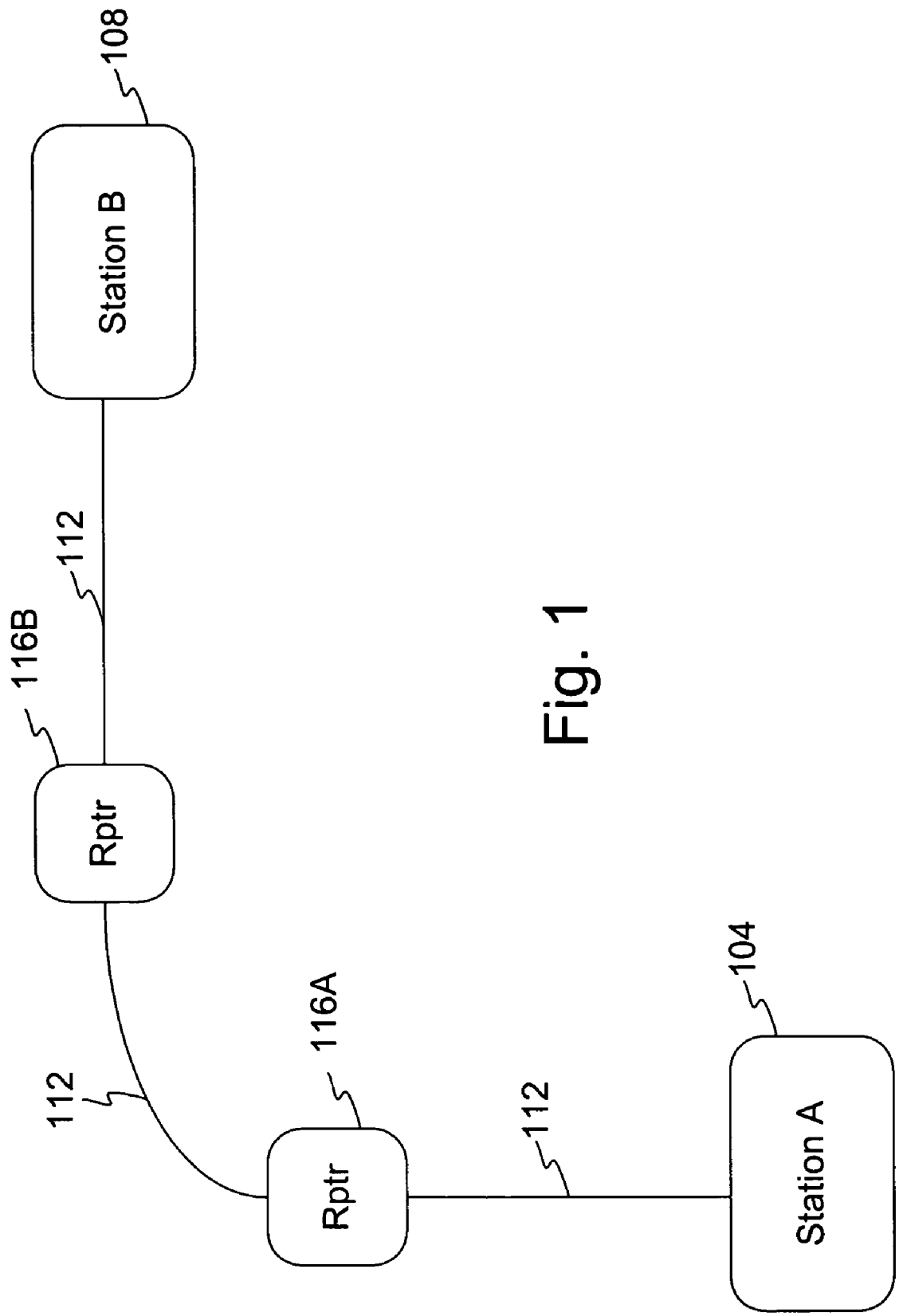
FIG. 1 illustrates an example environment of use of the present invention.

FIG. 1 illustrates an example environment of use of the present invention. In one example embodiment, the method and apparatus disclosed herein is utilized to communicate network data between a first station 104 and second station 108. The network data may travel over any path, conductor or channel 112 comprising, but not limited to, one or more metallic conductors, an optical channel, or free space communication such as radio or other frequency communication. If there exists sufficient distance between the first station 104 and the second station 108, one or more repeaters 116A, 116B may be required to process the signal so that the network data may reach the desired station. As is understood, a repeater may comprise a device that receives a signal and restores or amplifies the signal to a desired format before resending the signal onward. It is also contemplated that there may exist repeaters or stations in addition to those shown, or some systems may be configured without repeaters 116. The term network data comprises data that exchanged over the network, such as customer data, voice data, network data, or computer data. The term system data comprises data that is used by the communication system to achieve or improve the exchange of network data.

It is further contemplated that, in addition to network data, it may also be desired to exchange system data between the first station 104 and the second station 108, any of the stations and a repeater, or between repeaters. As discussed above, the term network data comprises data that is exchanged over the network such as customer data, voice data, computer data, or any other data or information. The term system data comprises data that is used by the communication system to achieve or improve the exchange of network data.

By exchanging system data between communication devices, collectively, repeaters, stations, or any other apparatus configured to aid in or enable communication, one or more aspects of the communication system may be monitored, adjusted, or exchanged. For example, one or more aspects of communication can be monitored and steps can be taken to modify some aspect of the communication to optimize the communication. Those of ordinary skill in the art may contemplate other additional uses for the method and apparatus described herein, and hence the claims that follow should not be construed as being limited to the example environments or example implementation set forth herein. Utilizing the method and apparatus described herein, any type of system data may be exchanged between communication devices for any purpose.

In one example embodiment, a low frequency signaling channel utilizing jitter modulation is established to exchange data between communication devices. Through use of low frequency signaling, system data may be exchanged to optimize, control, or otherwise monitor or manipulate communication system operation. Use of the low frequency signaling utilizing jitter modulation is discussed below in more detail.

Figure 2:
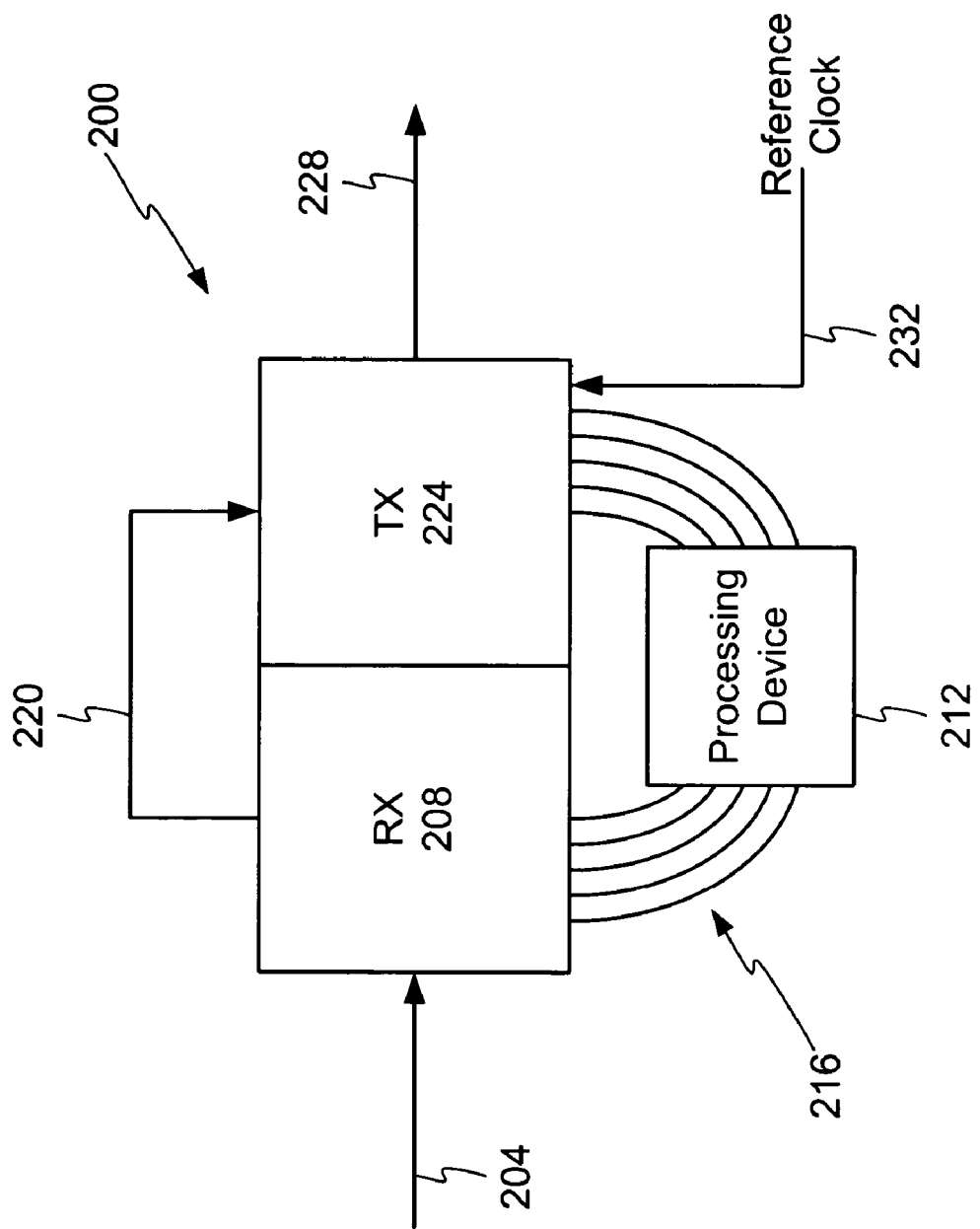
FIG. 2 illustrates a block diagram of an example embodiment of a repeater configured in accordance with the method and apparatus disclosed herein.

FIG. 2 illustrates a block diagram of an example embodiment of a repeater configured in accordance with the method and apparatus disclosed herein. In this example embodiment, the repeater 200 is characterized by a serial input line 204 that connects to a receiver portion 208 of the repeater 200. In this embodiment, the receiver portion 208 connects to a processing device 212 via one or more paths 216 and to a transmitter portion 224 of the repeater 200 via a low frequency path 220. The processing device 212 may comprise any type processing device including, but not limited to, a processor, ASIC, control logic, controller, or any other type device. The transmitter portion 224 provides an output on a path 228 and receives a reference clock signal on input 232.

The receiver portion 208 and the transmitter portion 224 may comprise any receiver system and transmitter system that is capable of achieving the functionality described herein. The functionality of both of the receiver portion 208 and the transmitter portion 224 is explained below in conjunction with several example embodiments.

In operation, the receiver portion 208 receives incoming network data and system data via path 204. In one embodiment, the system data is jitter modulated onto the network data. In one exemplary embodiment, the path 204 comprises a fiber optic cable configured to provide the data to the receiver portion 208 in a serial format. The receiver 208 processes that data and provides the network data to the processing device 212, and provides the low frequency system data to the transmitter 224 via path 220.

In one embodiment, the processing device 212 comprises an ASIC type processing device, but it is contemplated that in other embodiments the processing device may comprise any apparatus capable of analyzing and/or manipulating the network data. The output of the processing device 212 returns the network data to the transmitter 224 wherein the transmitter may recombine the network data with the system data for retransmission over output path 228. It is contemplated that the transmitter portion 224 may jitter modulate the system data onto the network data. Separation and combination of the network data signal and the system data signal is discussed below in more detail.

Figure 3:
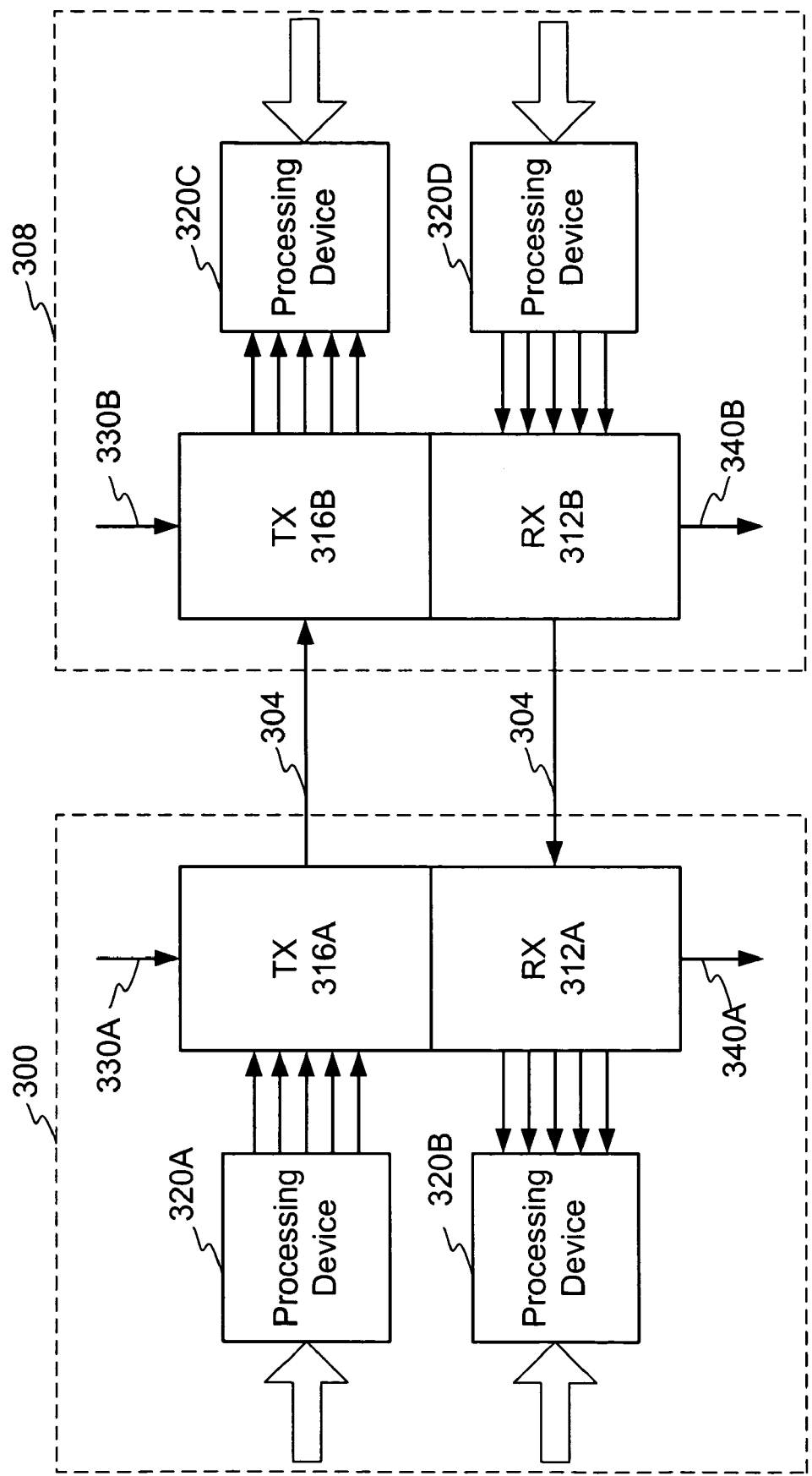
FIG. 3 illustrates a block diagram of an example embodiment of a multi-station communication system configured in accordance with the method and apparatus disclosed herein.

FIG. 3 illustrates a block diagram of an example embodiment of a multi-station communication system configured in accordance with the method and apparatus disclosed herein. The embodiment of FIG. 3 utilizes similar components as the system lo of FIG. 2. Therefore, during the discussion of FIG. 3, some components are not described in as great a detail, since reference can be made to the description of FIG. 2. As shown, a first station 300 is configured to communicate over one or more channels 304 with a second station 308. Each of the first station 300 and the second station 308 may comprise a receiver 312A, 312B and a transmitter 316A, 316B. At least one of the receivers 312A, 312B and transmitters 316A, 316B connects to a processing device 320A, 320B, 320C, 320D as shown. The processing devices 320 may comprise one or more processor, ASIC, control logic, switch fabric, or any other such device. Input to the processing devices 320 may occur in any manner known in the art. Similarly, although certain paths or interfaces are shown as either serial or parallel, it is fully contemplated that any of these paths may be configured as either serial or parallel paths or both.

As optional inputs 330A, 330B to the transmitters 316A, 316B, are inputs 330A, 330B that are provided for system data so that system data may be processed within or by the transmitters. This may allow the system data to be transmitted over the channel(s) 304 with the network data. In one embodiment, this data is jitter modulated with the network data. Similarly, the receivers 312A, 312B have output ports 340A, 340B configured to provide system data that was recovered or separated from the signal transmitted over channel 304.

To overcome the drawbacks of the prior art, the method and apparatus disclosed herein enables communication between stations utilizing jitter modulation of the network data. By selectively controlling the jitter of the network data, the system data is encoded onto the network data signal. In this manner, the system data is transmitted concurrent with the network data and in a manner that does not corrupt the network data and that does not result in the system data being lost as the combined signal passes through repeater stages or one or more additional stations.

Figure 4:
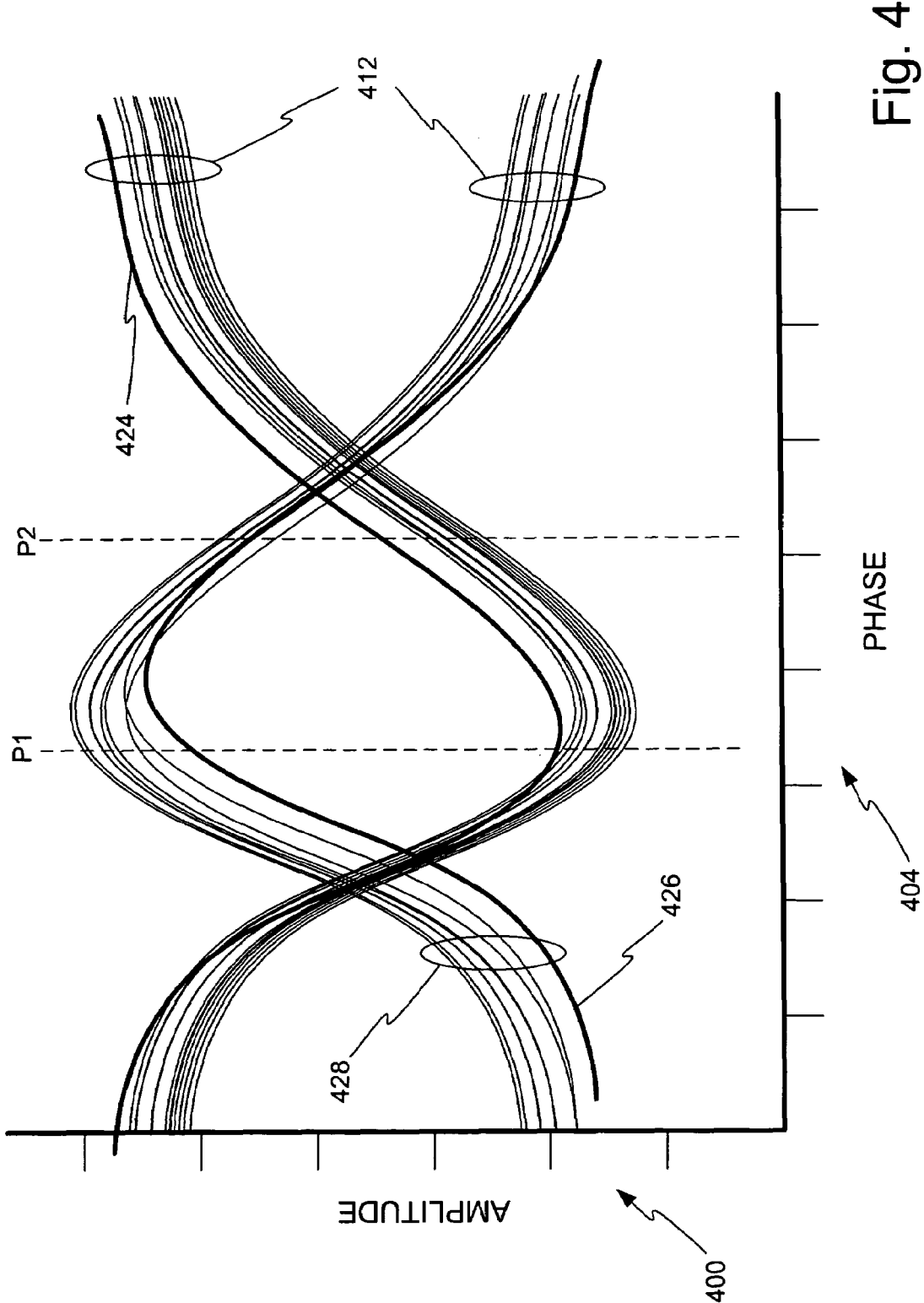
FIG. 4 illustrates an eye diagram of a system utilizing jitter modulation.

FIG. 4 illustrates an eye diagram and, together with the following discussion, is helpful in understanding the conceptual basis for the method and apparatus described herein. As shown in FIG. 4, a vertical axis 400 represents amplitude of a received signal while the horizontal axis 404 represents phase of the combined signal defined herein as the network data and the jitter modulated system data. The received signal, representing both the network data and the system data, is shown collectively by signal plots 412. These plots are the signals being transmitted and received between stations, or between repeaters, or between a station and a repeater, or between any communication points. As shown, the signal plots 412 have a degree of unwanted jitter that is inherently generated during the transmit process. It is conventional wisdom and is generally accepted in the art that jitter is an unwanted but inherent aspect of transmission. Jitter causes the eye of the eye diagram to close, which in turn may undesirably increase the bit error rate (BER). As a result, conventional wisdom in the prior art attempts to minimize jitter. In contrast to the conventional wisdom and accepted thinking in the art, the method and apparatus described and claimed herein increases jitter by jitter modulating the system data onto the network data signal.

Signal plot 420, which is shown with bold line, is now discussed. Signal plot 420 comprises a network data signal that has been jitter modulated to thereby have a phase offset as compared to other reference signals 428. Thus, at a period P1, the signal plot 420 is shifted to the left hand side of the figure to a greater degree than are reference signals 428. This indicates a phase shift, which can be detected at a receiver to recover system data. Similarly, signal plot 424, at a time period P2, is shifted slightly to the left as compared to other signal plots at time period P2. These shifts in jitter of the transmitted signal are introduced into the transmitted signal to represent the system data. Upon reception, the phase shifts of the jitter modulation can be detected and the system data recovered.

The slight introduction of jitter, which represents the system data in the transmitted signal, can be detected at a receiving station. In one embodiment, the jitter modulation is decoded in relation to a reference clock to allow for decoding, which may also occur in relation to a reference clock. In one embodiment, a clock data recovery circuit is utilized to recover the data.

As an advantage to this method of system data encoding the transmission, the regeneration of the signal, such as for example by repeaters, does not saturate or corrupt the jitter modulated system data. Communication based on amplitude modulation suffers from system data loss when repeaters enter saturation, thereby compressing the amplitude-modulated data. In addition, use of jitter modulation does not force the driver circuits or the optical signal emitting device in an optic system to output higher power levels than would be required if jitter modulation were not occurring. This is not true of amplitude modulation, which may decrease the lifespan of the optical signal-emitting device.

Yet another advantage of the method and apparatus described herein is that it is capable of utilizing existing components that are already utilized within modern communication devices. The method and apparatus described herein does not require additional de-modulators, modulators, or other such hardware. Thus the cost, complexity, power consumption, and heat generation as part of implementing the invention is minimized. Moreover, processing of the system data may be done at low frequencies, thereby minimizing system complexity.

Figure 5:
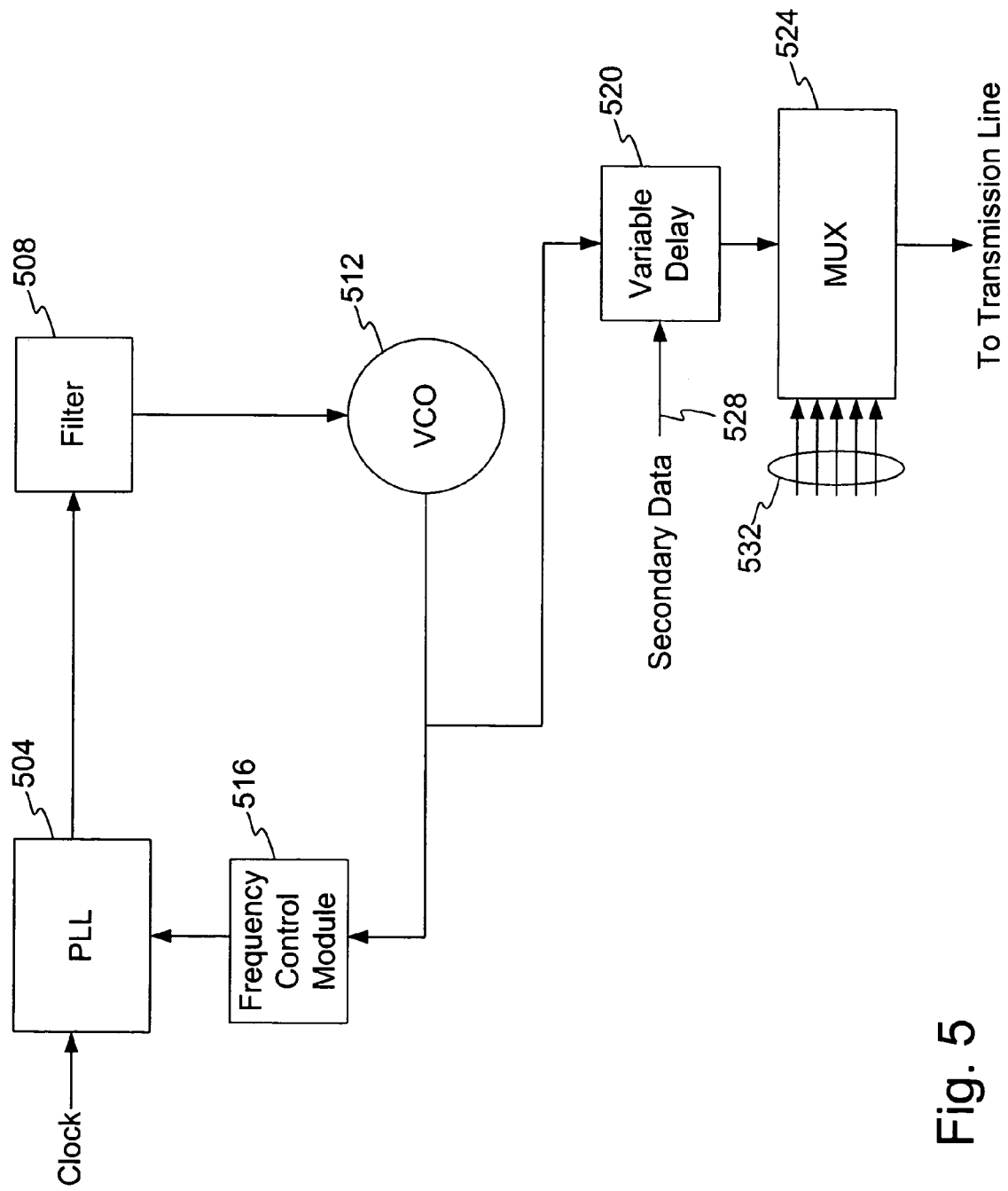
FIG. 5 illustrates a block diagram of an example embodiment of a transmitter configured according to the teaching disclosed herein.

FIG. 5 illustrates a block diagram of an example embodiment of a transmitter configured in accordance with the present invention. This is but one possible embodiment that is capable of combining or encoding a secondary signal, such as system data, with the network data. It should be noted that any type of data, collectively secondary data, may be encoded or combined with the network data as described herein.

Turning now to FIG. 5, a phase lock loop circuit or device 504 (PLL), which is a part of a timing circuit, receives a clock signal. The operation of a PLL 504 is generally understood by one of ordinary skill in the art, and hence it is not described in detail herein. The output of the PLL connects to a pass band filter 508 configured to pass a particular frequency band. The filter output feeds into a voltage controlled oscillator (VCO) 512 or other device capable of generating a frequency specific signal based on a voltage of the received signal. The output of the VCO 512 connects to a frequency control module 516, which may comprise any device capable of modifying the frequency of the signal output from the VCO 512. It is contemplated that the frequency control module 516 may comprise one or more of the following: a divider, counter, processor, or any other device configured to modify the frequency of a signal. The output of the frequency control module 516 feeds back into the PLL 504 to create a loop.

The loop is defined as the loop created by elements 504, 508, 512, and 516. The loop is assumed to have a loop bandwidth defined by the maximum rate of change of the loop in tracking changes in the signal passing through the loop. For signals having a rate of change that is greater than the loop bandwidth, the loop is able to track such changes. Conversely, the loop is able to track signals having a rate of change that is less than the loop bandwidth. In prior art systems, the loop signal is utilized to control the timing of transmission.

The present invention, however, provides the output of the VCO 512 to a variable delay 520, and the output of the variable delay 520 feeds into a multiplexer 524 or other switching device. The variable delay 512 may comprise any device capable of introducing a controllable delay into the signal provided to the multiplexer 524. In one embodiment, the variable delay comprises one or more buffers, registers, or flip-flops. In this embodiment, the output of the variable delay 520 serves as the clock that controls the timing of the multiplexer 524. Any type of multiplexer 524 or switch system that operates in accordance with the method described herein may be utilized.

In this embodiment, the VCO output is modified by the variable delay 520 prior to serving as the clock for the multiplexer 524. A control signal input 528 provides a control signal to the variable delay 520 to thereby control the amount of delay that is introduced into the multiplexer timing signal.

The multiplexer 524 receives the multiplexer control signal 524 and one or more inputs from a data source via inputs 532. In one embodiment, the data source outputs carry network data that is to be transmitted by the transmitter. It is contemplated that the data source outputs may be part of any data source, such as a switch, processor, data base, memory, or any other device. In one embodiment, the signal from the VCO 512, that passes through the variable delay 520, controls the output timing of the data source signals, received over inputs 532, from the multiplexer 524. In one embodiment the control signal input 528 that is provided to the variable delay comprises secondary data, and in one embodiment the secondary data comprises system data.

In one example method of operation, network data is provided to the multiplexer 524 via inputs 532 for transmission over a transmission line or path. In one embodiment, the multiplexer 524 is configured to convert the network data received over inputs 532 in a parallel format to a serial format for transmission. In one embodiment, the transmission of network data occurs at a high data rate over an optic channel, but processing of the data, such as in stations or repeaters, occurs at a lower rate, and is hence reformatted to a parallel format for processing. The output timing of the multiplexer is controlled by the output of the variable delay. By controlling the timing of the multiplexer control signal, i.e., through use of the variable delay 520 or other equivalent device, the timing of transmission can be precisely controlled. The amount of variable delay can be directly related to the secondary data, such as the system data, to thereby jitter modulate the system data into the network data. In this manner, the system data may be transmitted to other stations or repeaters concurrent with the transmission of network data. In this manner, jitter modulation may occur to control the timing of the transmission of the network data and thereby encode secondary data, such as for example, system data.

As a result of the processing occurring in conjunction with the system of FIG. 5, the transmitted signal comprises network data with low frequency secondary data jitter modulated thereon. During transmission, the signal may also pick up or come to include a high frequency jitter component. This is understood in the art and occurs as part of the transmission process and/or passage of the signal through the channel or line. Thus, the received signal comprises the network data (ND) with a low frequency jitter component ($J_{LF}$) comprising the secondary data, and a high frequency jitter component ($J_{HF}$).

Figure 6:
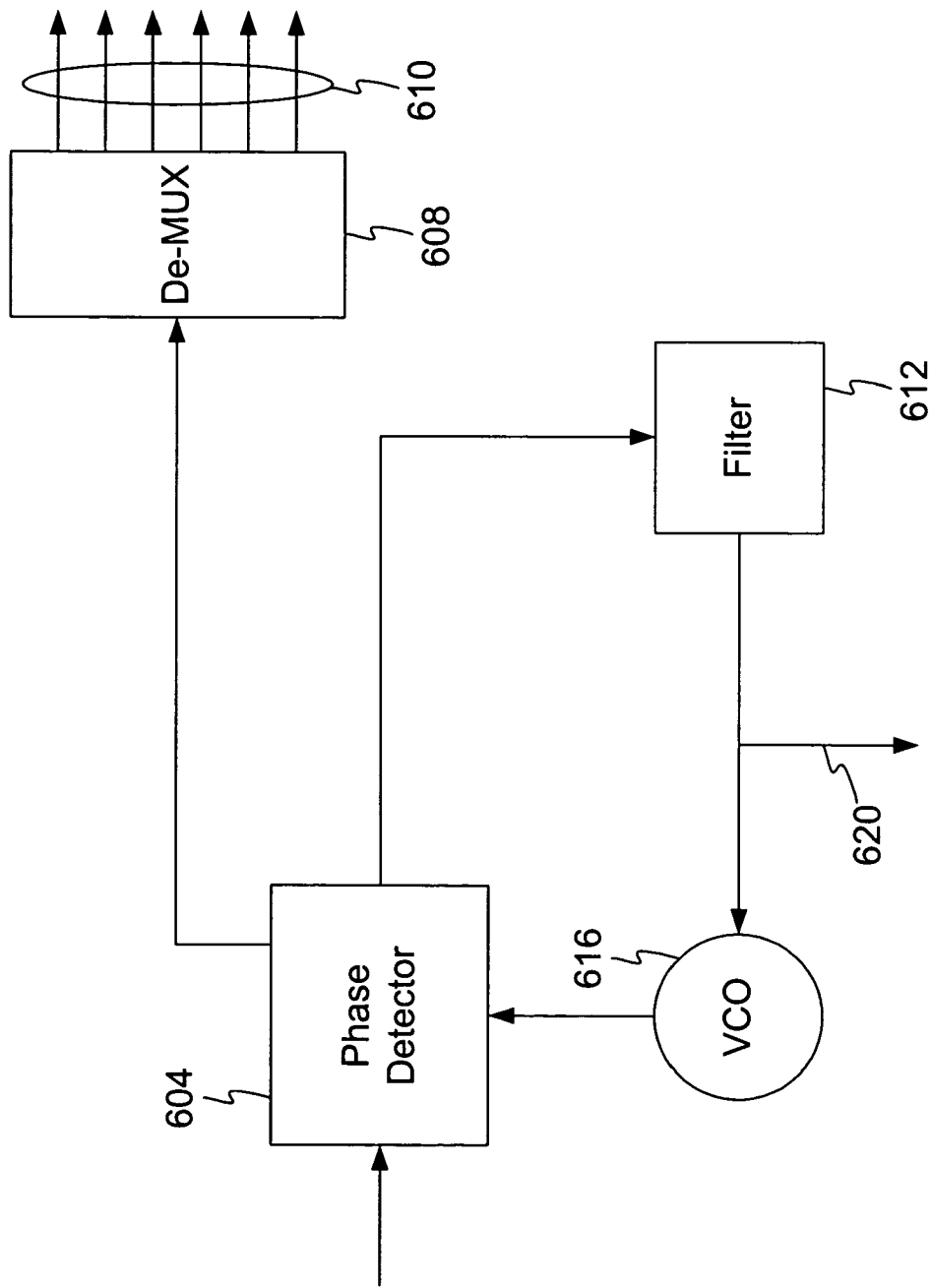
FIG. 6 illustrates a block diagram of an example embodiment of a receiver configured according to the teaching disclosed herein.

FIG. 6 illustrates a block diagram of an example embodiment of a receiver configured according to the teaching disclosed herein. This is but one possible example embodiment of a receiver configured in accordance with the method and apparatus disclosed herein. It is contemplated that other receiver configurations or methods of operation may be enabled by one of ordinary skill in the art without departing from the scope of the claims that follow. As shown, a phase detector 604 receives an incoming signal that was received from a remote station or repeater. It is contemplated that this incoming signal comprises a signal comprising both the network data and secondary data, such as system data, that has been jitter modulated on the transmitted signal. It is desired to recover the secondary data while also recovering the network data.

A first output of the phase detector 604 connects to a de-multiplexer 608, while another output of the phase detector connects to a filter 612. The de-multiplexer 608 is configured to convert the network data arriving in a serial format into a parallel format on outputs 610. Operation of the phase detector 604 is generally understood by one of ordinary skill in the art and hence is not described in detail herein.

A second output from the phase detector 604 provides a loop signal to a filter 612. The filter 612 comprises a band pass filter configured to output a select frequency band of the received loop signal to a VCO 616 and an output port 620. The output of the VCO 616 completes the loop by connecting to the phase detector 604 to create a loop as discussed above. It is contemplated that this loop has a loop bandwidth defined by the maximum rate of change that can be tracked by the loop. In some embodiments, this loop is commonly known as a CDR loop.

As discussed above, the output from the phase detector 604 that connects to the de-multiplexer 608 carries the network data signal. This signal has been retimed and unwanted jitter aspects have been removed. The de-multiplexer 608 converts the serial stream of data to a parallel format as shown.

The loop defined by elements 604, 612, and 616 generates a loop signal. Variations in the loop signal that occur at a rate above the loop bandwidth are unable to be tracked by the loop. However, the loop is able to track signal variations that occur at a rate that is below the loop bandwidth. As a result, the loop, being unable to track high frequency jitter, removes the unwanted high frequency jitter from the loop signal to accurately track the network data. The low frequency secondary data jitter is below the loop bandwidth, and hence the loop tracks this jitter. The signal that passes within the loop will track the phase changes caused by the timing variation from the variable delay in the transmitter that encoded the secondary data onto the network data. Consequently, the data port 620 can be monitored to obtain the secondary data.

In the embodiment of FIG. 6, the voltage at the output port 620 of the loop varies based on the amount of variable delay that is introduced in the transmitter. By monitoring the voltage on the output port 620, the secondary data may be recovered.

Figure 7:
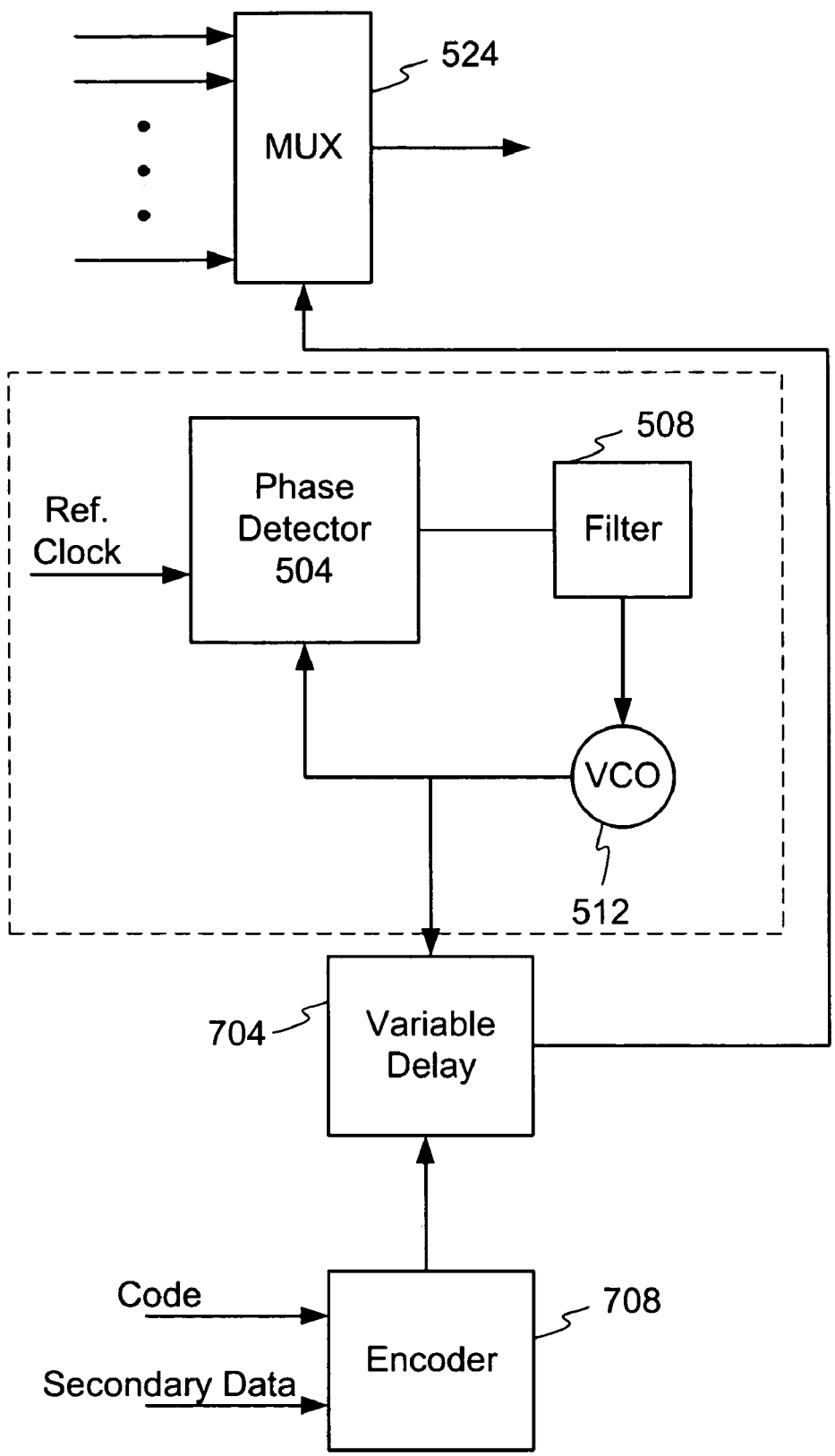
FIG. 7 illustrates a block diagram of an alternative embodiment of a transmitter configured to perform secondary data encoding.

FIG. 7 illustrates a block diagram of an alternative embodiment of a transmitter configured to encode secondary data. FIG. 7 shares common elements with FIG. 5, and hence common reference signs are utilized and duplicate items are not discussed again. As shown, a tap or connection from the output of the VCO 512 output provides the signal to a variable delay 704. The variable delay 704 generates a multiplexer control signal that is provided to the multiplexer 524. Operation of the multiplexer 524 occurs as described above.

Of interest in FIG. 7 is the variable delay control signal received from an encoder 708 that is configured to generate an encoded secondary data signal to thereby control the amount of delay that is introduced into the multiplexer control signal. The encoder 708 may comprise any configuration of software, hardware, or both that is configured to generate an encoded secondary data signal. In one embodiment the encoder comprises control logic, while in another embodiment the encoder comprises an ASIC. The encoder may comprise a processor or one or more multipliers.

In one embodiment, the encoder 708 is configured to perform code division multiple access (CDMA) type encoding on the secondary data. Those of ordinary skill in the art are familiar with CDMA type encoding, and hence the particulars of CDMA encoding are not discussed in detail herein beyond the following. In one embodiment, the encoder 708 receives a code and the secondary data. In one embodiment, the code comprises an orthogonal code. The encoder processes the code and the secondary data to generate an encoded secondary data signal, which is in turn provided to the variable delay. As a result of the encoding, the introduction of delay and the amount of delay is controlled by the encoded secondary signal. In one embodiment, the secondary data is multiplied by an orthogonal code that comprises a spreading code. Thus, secondary data is spread over the orthogonal code. To recover the secondary signal at a receiver, decoding is performed as is discussed below.

One advantage to orthogonal spreading code encoding is that the amount of delay introduced into the transmitted network data is reduced. This in turn can increase the accuracy of network data recovery, since less low frequency jitter is introduced into the transmitted signal. Use of the orthogonal spreading code does suffer from the drawback of reducing the effective data transmit rate for the secondary data, since the amount of encoded data is increased due to the encoding processing.

Figure 8:
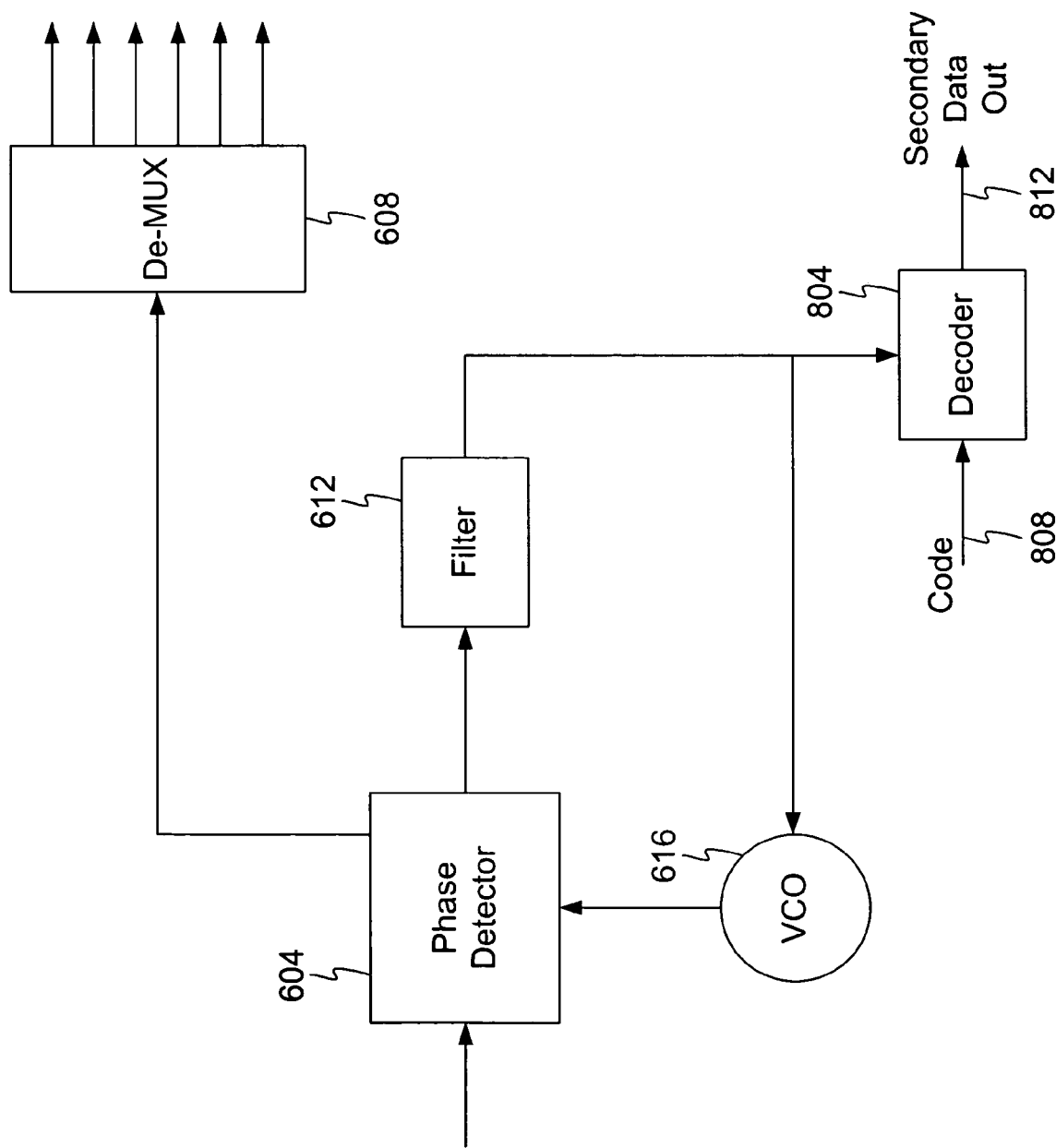
FIG. 8 illustrates a block diagram of an example embodiment of a transmitter configured to perform secondary data decoding.

FIG. 8 illustrates a block diagram of an example embodiment of a transmitter configured for secondary data decoding. FIG. 8 shares common elements with FIG. 6, and hence common reference signs are utilized and duplicate items are not discussed again. In this embodiment, a decoder 804 connects to the output of the filter 612 as shown. The decoder 804 may comprise any type decoder capable of recovering the secondary data. It is contemplated that the decoder 804 may be configured to reverse the encoding that occurs in the transmitter. The decoder 804 receives a code selected for use in decoding the secondary data. As discussed above, the loop signal may be tapped as shown and provided to the decoder 804. The decoder 804 outputs the secondary data on path 812.

In one embodiment, the code received by the decoder is an orthogonal code that may be identical to the orthogonal code utilized to encode the data. As an advantage to utilizing encoded secondary data, the encoding can reduce the amount of jitter that the variable delay introduces into the network data signal, thereby opening the eye of the eye diagram and reducing the BER.

As discussed above, the received signal comprises the network data with a low frequency jitter component ($J_{LF}$) comprising the secondary data, and a high frequency jitter component ($J_{HF}$). The high frequency jitter ($J_{HF}$) is considered to be undesirable noise, but it is inherent in communication system transmission. Because the frequency of the $J_{HF}$ is above the loop bandwidth, the loop does not track the high frequency jitter. The loop does track the $J_{LF}$, however, and hence the secondary data can be recovered.

In a non-encoded system, the $J_{HF}$ can interfere with a receiver's ability to isolate, and hence recover, the secondary data (SDj) and the network data. In some instances, it is helpful to increase the amount of delay that is introduced into the network data transmission using the variable delay to more greatly accentuate the phase difference of the jitter modulated secondary data. However, by increasing the jitter used to represent the secondary data ($J_{LF}$), the BER for the network data can increase, because increasing the $J_{LF}$ also closes the eye of the eye diagram. By encoding the secondary data, these problems can be overcome because with encoded data, the amount of phase jitter that must be introduced into the network data is reduced. In one embodiment, a spread spectrum encoding scheme is utilized. In such an embodiment, orthogonal codes may be utilized to spread the $J_{LF}$ representing the secondary data over a longer transmit period while reducing the amount of jitter that is introduced. Upon reception, the encoded secondary data may be recovered, yet the BER is minimized due to the minimal amount of low frequency jitter introduced by the spreading of the secondary data.

Figure 9:
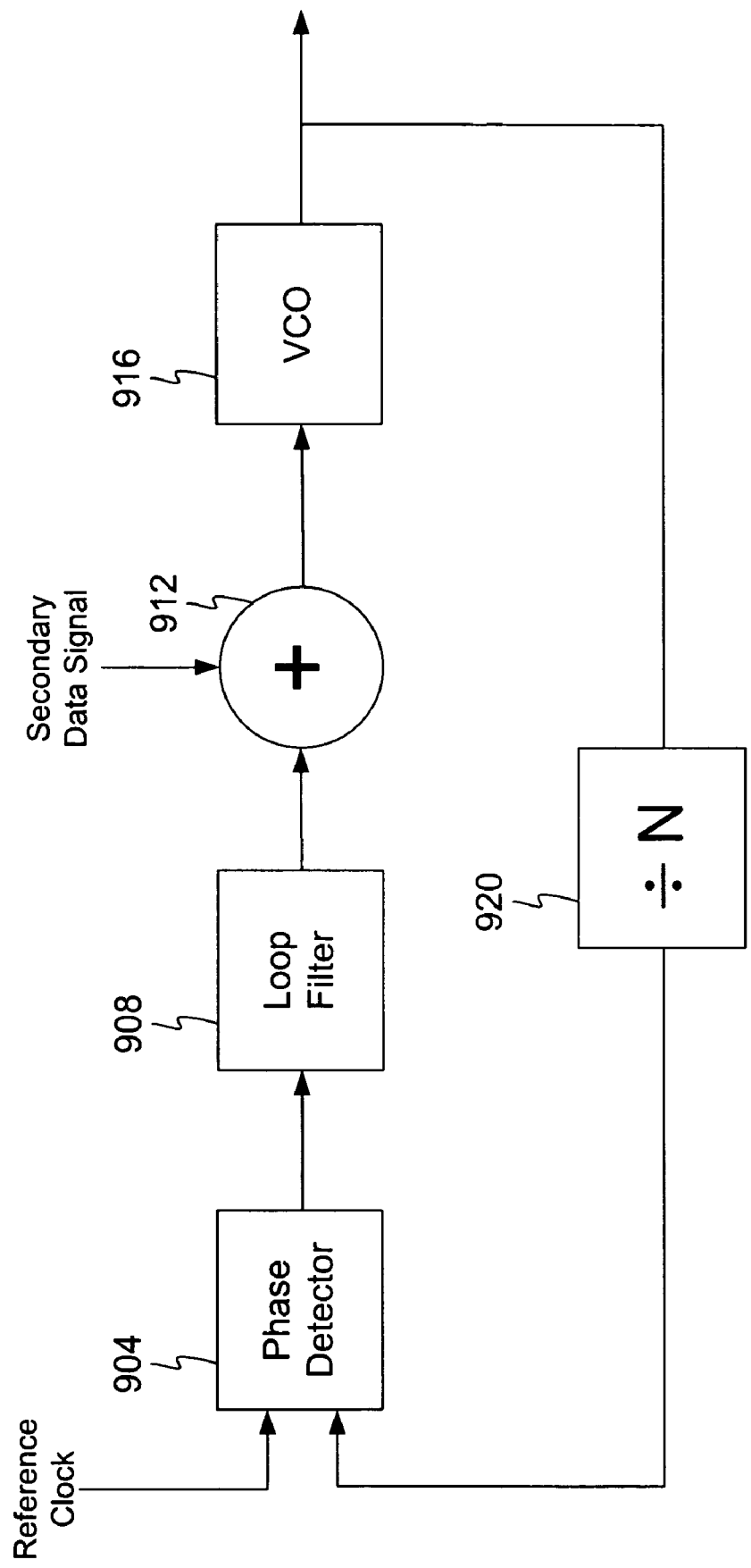
FIG. 9 illustrates a block diagram of an example embodiment of a phase modulation transmitter incorporating a phase locked loop.

FIG. 9 illustrates a block diagram of an example embodiment of a phase modulation transmitter incorporating a phase locked loop. This is but one possible example embodiment and it is contemplated that other embodiment may be arrived at by one of ordinary skill in the art without departing from the scope of the claims that follow. As shown, a phase detector 904 receives a reference clock signal and a feedback signal from a divider 920. The divider 920 may comprise any frequency modification device or a frequency control module as described above. The output of the phase detector is provided to a loop filter 908, the output of which is provided to a junction 912, which may be an adder or subtractor. The junction 912 also receives as an input the secondary data, which may comprise system data.

The output of the junction 912 feeds into a voltage controlled oscillator (VCO) 916. The output of the VCO 916 comprises a signal that controls the timing of the transmitted data, although it is contemplated that the transmit signal may undergo additional processing prior to controlling of the transmission of data, such as customer or network data, over a channel. The output of the VCO 916 is also provided to a divider 920, the output of which is the feedback signal provided to the phase detector 904.

In one example embodiment, the phase detector 904 generates a signal proportional to the phase difference between the reference clock signal and the clock that is fed back from the VCO 916. The feedback signal is divided down in frequency from the VCO output because the average frequency of the VCO 916 may be the same as that of the optical signal while the frequency of the reference clock may be (but not necessarily) much lower in frequency. The phase detector circuit may generate high frequency components which must be filtered out by the loop filter 908. In this embodiment the secondary data signal is added, by the junction 912, to the output of the loop filter 908 to modulate the phase of the VCO output. One implementation first passes the data through a scrambler; otherwise, the modulation could have a nonzero mean which could cause problems in the receiver. It is also possible to employ forward error and/or spread spectrum to reduce the transmit power level requirements. This is important because the distortion in optical channels is, in general, nonlinear. As a result, low frequency signal components may result in higher frequency harmonics which can interfere with the payload.

Figure 10:
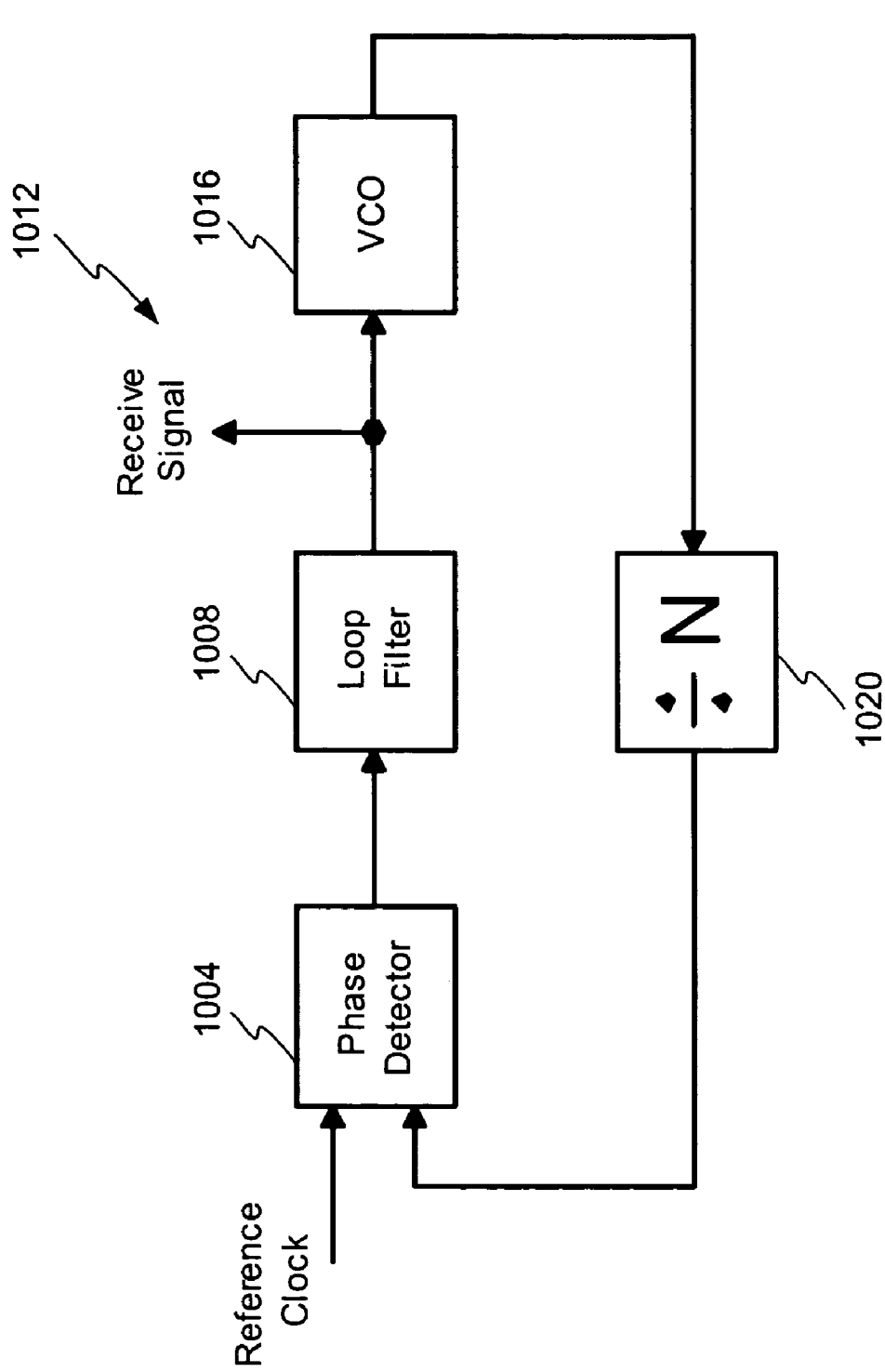
FIG. 10 illustrates a block diagram of an example embodiment of a receiver phase lock loop configured to obtain secondary data from a phase modulated signal.

FIG. 10 illustrates a block diagram of an example embodiment of a receiver phase lock loop configured to obtain secondary data from a phase modulated signal. This is but one possible example embodiment and it is contemplated that other embodiments may be arrived at by one of ordinary skill in the art without departing from the scope of the claims that follow.

As shown, a reference clock signal is provided to a phase detector 1004, which also receives a feedback signal from a frequency modification device 1020 or frequency control module, in this embodiment a divider. The output of the phase detector 1004 connects to a loop filter 1008, which in turn provides its output to a voltage controlled oscillator (VCO) 1016. The output of the loop filter 1008 also comprises the received secondary signal data. In one embodiment this comprises the error term of the loop. The VCO 1016 modifies the signal in accordance with it operation, which is generally understood, to provide an output to the divider 1020 as shown. The divider 1020 modifies the frequency of the signal and provides its output as a feedback signal to the phase detector 1004.

In operation, it is contemplated that the processing of the receive signal may be shown to have complementary functions for those in the transmitter. In addition, if the loop filter is not sufficiently narrowband, it may be beneficial to process the received signal with a noise reduction filter. The bandwidth of the loop filter is driven by the requirements of the PLL and the system and it may not be possible to have the bandwidth be adjusted to the requirements of the secondary signal.

Figure 11:
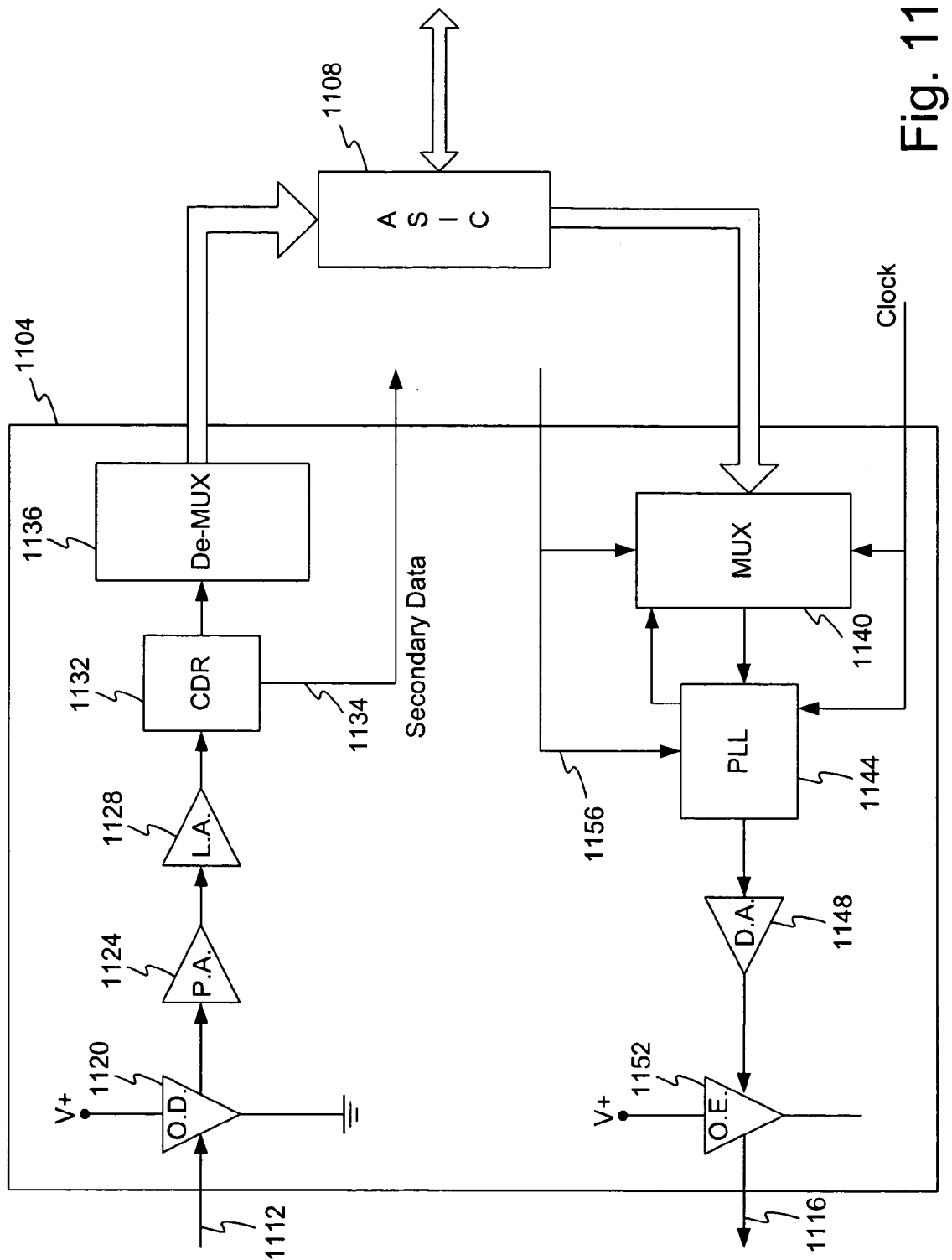
FIG. 11 illustrates a block diagram of an implementation example of the secondary data transmit system in a communication station.

FIG. 11 illustrates a block diagram of an implementation example of one possible embodiment of a secondary data transmit system in a communication station. As shown, a transmit module 1104 is in communication with an ASIC 1108, a first optic fiber 1112, and a second optic fiber 1116. The first optic fiber 1112 connects to an optical detector 1120 configured to detect an incoming optical signal and convert the optical signal to an electrical signal. The output of the optical detector 1120 feeds into pre-amplifier 1124 configured to amplify the low power level signal from the optical detector to a level that is suitable for processing by the down stream processing systems. The output of the pre-amplifier 1124 connects to a limiting amplifier 1128.

A CDR circuit 1132 receives the output of the limiting amplifier 1128. Operation of the CDR circuit 1132 is discussed above in detail in conjunction with FIGS. 6 and 8. The CDR circuit 1132 may be configured to isolate the secondary data on output 1134. In this manner, the secondary data, such as system data, may be output from the transmit module 1104. The CDR circuit 1132 outputs the network data to a de-multiplexer 1136. In one embodiment, the de-multiplexer 1136 converts a serial bit stream to a parallel format, which is provided to an ASIC 1108 or other processing device. The ASIC 1108 may comprise any type processing device. The ASIC 1108 may be configured to analyze the network data and re-transmit all or a portion of the network data, or be configured to provide data to another device associated with the communication device, or be configured to provide data to an upstream processing system.

On the transmit side of the transmit module, the ASIC 1108 connects to a multiplexer 1140. The multiplexer 1140 may also be configured to receive incoming secondary data that is to be combined with the outgoing network data. The multiplexer 1140 may output network data in a serial format after having received it in parallel format. The multiplexer 1140 has an output connected to a PLL circuit 1144, which may also receive the secondary data via path 1156. In this embodiment, the PLL circuit 1144, in conjunction with the multiplexer 1140, combines the secondary data into the network data. In one embodiment, this occurs utilizing a jitter modulation of the secondary data onto the network data. In one embodiment, the secondary data is encoded prior to modulation onto the network data. The PLL 1144 is described above in conjunction with FIGS. 5 and 7, and hence is not described again in detail.

The output of the PLL circuit 1144 feeds into a driver amplifier 1148 configured to provide a driver signal to an optical emitter 1152. The optical emitter generates an optical signal representative of the driver amplifier output. In one embodiment, the optical emitter comprises a laser or light emitting diode. The optical emitter 1152 transmits the network data with secondary data jitter modulated over an optic fiber 1116.

While various embodiments of the invention have been described, it will be apparent to those of ordinary skill in the art that many more embodiments and implementations are possible that are within the scope of this invention.

What is claimed is:

1. A system for jitter modulating secondary data onto the transmission of network data, the system comprising:
    a phase lock loop circuit comprising:
        a phase detector configured to receive a clock signal and a feedback signal;
        a filter configured to filter the output of the phase detector to create a filtered signal;
        a junction configured to combine secondary data with the filtered signal to create a combined signal wherein the secondary data comprises system data that controls at least one aspect of operation of a remote communication device;
        voltage controlled oscillator configured to generate a timing signal based on the voltage of the combined signal, the timing signal for use in controlling the timing of network data transmission;
    a transmitter configured to transmit network data over a network communication channel, the timing of which is based on the combined signal, wherein the timing of the network data indicates the secondary data; and
    an encoder configured to encode the secondary data, wherein the encoder utilizes an orthogonal code.

2. The system of claim 1, wherein the timing of transmission of the network data represents the secondary data.

3. The system of claim 1, further comprising a frequency control module configured to modify a feedback signal from the voltage controlled oscillator to the phase detector.

4. A method for recovering secondary data from network data having secondary data jitter modulated thereon after reception of the network data at a receiving communication device, the method comprising:
    receiving an input signal comprising network data that has been jitter modulated to contain secondary data;
    processing the input signal with a phase detector to recover the network data;
    generating a loop signal as part of phase detector operation;
    filtering the loop signal to generate a filtered loop signal; and
    processing the filtered loop signal with the voltage detector to recover the secondary data, wherein processing the filtered loop signal comprises decoding the filtered loop signal to obtain the secondary data, wherein processing the filtered loop signal comprises detecting the changes in voltage in the filtered loop signal to determine the secondary data.

5. The method of claim 4, wherein the changes in voltage correspond to low frequency jitter.

6. The method of claim 4, wherein the decoding comprises multiplication of the filtered loop signal with a spreading code.

7. A method for recovering secondary data from network data having secondary data jitter modulated thereon after reception of the network data at a receiving communication device, the method comprising:
    receiving an input signal comprising network data that has been jitter modulated to contain secondary data;
    processing the input signal with a phase detector to recover the network data;
    generating a loop signal as part of phase detector operation;
    filtering the loop signal to generate a filtered loop signal; and
    processing the filtered loop signal with the voltage detector to recover the secondary data, wherein processing the filtered loop signal comprises decoding the filtered loop signal to obtain the secondary data, wherein the decoding comprises multiplication of the filtered loop signal with a spreading code.

8. The method of claim 7, wherein processing the filtered loop signal comprises detecting the changes in voltage in the filtered loop signal to determine the secondary data.

9. The method of claim 8, wherein the changes in voltage correspond to low frequency jitter.

* * * * *